(12) United States Patent
McKinney

(10) Patent No.: US 7,294,260 B2
(45) Date of Patent: Nov. 13, 2007

(54) AEROBIC WASTEWATER TREATMENT PLANT HAVING 3-COMPARTMENT VESSEL

(75) Inventor: Jerry L. McKinney, Hardin County, TX (US)

(73) Assignee: Jerry L. McKinney 202 Trust, Silsbee, TX (US)

( * ) Notice: Subject to any disclaimer, the term of this patent is extended or adjusted under 35 U.S.C. 154(b) by 0 days.

(21) Appl. No.: 11/401,731

(22) Filed: Apr. 11, 2006

(65) Prior Publication Data

US 2006/0254967 A1 Nov. 16, 2006

Related U.S. Application Data

(60) Provisional application No. 60/670,146, filed on Apr. 11, 2005.

(51) Int. Cl.
*C02F 3/00* (2006.01)

(52) U.S. Cl. .................................. 210/220; 210/532.2

(58) Field of Classification Search .............. 210/220, 210/532.2
See application file for complete search history.

(56) References Cited

U.S. PATENT DOCUMENTS

| 1,715,466 | A | 6/1929 | Miller |
| 4,325,823 | A | 4/1982 | Graham |
| 6,200,472 | B1 | 3/2001 | Donald et al. |
| 6,224,752 | B1 | 5/2001 | Drewery |
| 6,406,619 | B1 | 6/2002 | Donald et al. |

OTHER PUBLICATIONS

"Hoot" Brochure Undated Murphy Cormier Gen Cont.

*Primary Examiner*—Chester T. Barry
(74) *Attorney, Agent, or Firm*—Browning Bushman P.C.

(57) ABSTRACT

An aerobic wastewater treatment plant having a peripheral wall, at least three compartments being formed within the peripheral wall in conjunction with bottom wall, the peripheral wall having first and second end walls which are radiused and having at least portions thereof which have the same radius and the first and second side wall, the side wall and end walls being shaped and adjoined to each other so as to form a smooth contour on the outer surface of the peripheral wall, the peripheral wall preferably having an oval-like configuration when viewed in top plan view.

9 Claims, 4 Drawing Sheets

AEROBIC WASTEWATER TREATMENT PLANT HAVING 3-COMPARTMENT VESSEL

CROSS REFERENCE TO RELATED APPLICATION

This application claims the priority of U.S. Provisional Application No. 60/670,146 filed on Apr. 11, 2005, the disclosure of which is incorporated herein by reference for all purposes.

BACKGROUND OF THE INVENTION

1. Field of the Invention

The present invention relates to wastewater treatment plants or systems and, more particularly, to a 3-compartment vessel for use in such plants.

2. Description of Prior Art

In U.S. Pat. No. 6,406,619 ('619 patent) there is disclosed a three compartment vessel for use in waste water treatment systems. The vessel disclosed in the '619 patent comprises a centrally located, generally cylindrical vessel and two end tanks attached to the central, cylindrical vessel. The two end tanks are crescent shaped when viewed in top plan view. In the system disclosed in the '619 patent, one of the end tanks is a pretreatment tank into which the raw waste stream is introduced. The center, cylindrical vessel is an aerobic treatment tank. The fluid from the pretreatment tank, from which a majority of the solids have settled, flows into the aerobic treatment tank wherein it is treated with an oxygen-containing gas in the well-known manner so that the bacteria can aerobically digest the remaining solids. The clarified water from the center, aerobic tank then flows into a post treatment tank, commonly referred to as a pump tank, from which the water can then be dispensed, i.e., for irrigation, or if properly chlorinated, into certain streams, etc. As noted in the '619 patent, the center, cylindrical tank is the largest of the three and can contain a volume of from 800 to 1,400 gallons of liquid, the preferred embodiment holding roughly 1,000 gallons of liquid. The two end tanks, i.e., the pretreatment and post-treatment tanks, as disclosed in the '619 patent are smaller and typically range in size from 300 to 1,000 gallons, and in the preferred embodiment the pretreatment tank holds 400 gallons while the post-treatment tank holds 750 gallons.

SUMMARY OF THE INVENTION

In one aspect, the present invention provides an aerobic wastewater treatment plant comprised of a tank having a peripheral wall and a generally planar bottom wall. The peripheral wall comprises first and second spaced side walls and first and second spaced end walls, each of the first and second end walls being radiused and having at least portions thereof which have the same radius. The first and second side walls have a shape and are adjoined to the first and second end walls such as to form a smooth, exterior contour. There is a first interior wall connected to the peripheral wall and the bottom wall, the first interior wall being spaced from the first end wall. A first compartment is formed by the first end wall and the first interior wall, the first compartment forming a pretreatment chamber and having an inlet and an outlet. There is a second interior wall spaced from the first interior wall and the second end wall, the second interior wall and the second end wall cooperating to form a generally cylindrical second compartment forming an aerobic treatment chamber. The second compartment has an inlet and an outlet. A third compartment forming a holding chamber is formed between the first compartment and the second compartment. The third compartment has an inlet and an outlet. The outlet from the first compartment is in open communication with the inlet to the second compartment, while the outlet from the second compartment is in open communication with the inlet to the third compartment.

In another embodiment, the present invention provides an aerobic wastewater treatment plant comprising a tank having a peripheral wall and a generally planar bottom wall. The peripheral wall comprises first and second spaced side walls and first and second spaced end walls. Each of the first and second end walls are radiused and have at least portions thereof which have the same radius. The first and second side walls are convex and are adjoined to the first and second end walls such as to form a smooth, exterior contour. There is a first generally cylindrical compartment formed in the tank between the first and second end walls, the first compartment forming an aerobic treatment chamber. The first compartment has an inlet and an outlet. A second compartment is formed between the first end wall and the cylindrical compartment, the second compartment having an inlet and an outlet. A third compartment is formed between the second compartment and the second end wall, the second compartment having an inlet and an outlet. The outlet from the second compartment is in open communication with the inlet to the first compartment while the outlet from the first compartment is in open communication with the inlet to the third compartment.

DETAILED DESCRIPTION OF PREFERRED EMBODIMENTS

Figure 1:
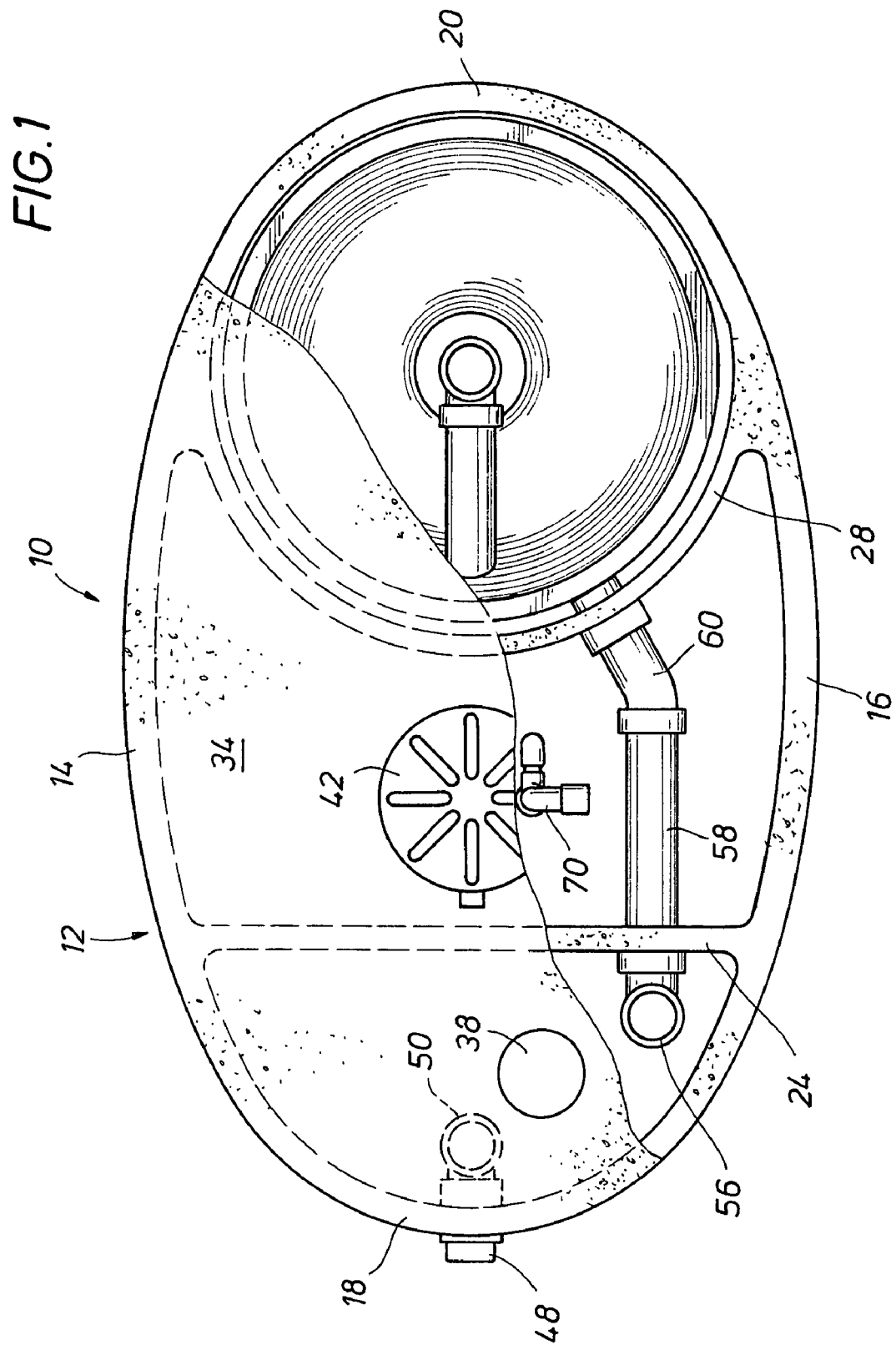
FIG. 1 is a top, plan view of one embodiment of the wastewater treatment plant of the present invention.

Referring first to FIG. 1, there is shown a tank or vessel 10 having a peripheral wall indicated generally as 12. The peripheral wall 12 has a first side wall 14 and a spaced, second side wall 16. The peripheral wall 12 also comprises a first end wall 18 and a second end wall 20. As seen, side wall 14 is adjoined to end walls 18 and 20 while side wall 16 is likewise adjoined to end walls 18 and 20. Side walls 14 and 16 are shaped, in this case convex, and attached to end walls 18 and 20 such that the outer surface of the peripheral wall 12 has a smooth contour and, in the form shown in FIG. 1, is oval-like in top plan view. It will be understood that peripheral wall 12 could have a shape which in fact was truly oval as opposed to being "oval-like." Additionally, sides 14 and 16 of tank 10 shown in FIG. 1 could have generally parallel portions whereby the overall configuration of peripheral wall 12 would be that of a race track again when viewed in top plan view. End walls 18 and 20, as seen, are radiused for at least a portion of their extent and both end walls 18 and 20 have portions thereof which have the same radius. In any event, whatever the configuration of the side walls 14 and 16 and the end walls 18 and 20, the respective walls will have a shape and be adjoined to one another such as to form a smooth contour on the exterior surface of the peripheral wall.

The term "smooth contour" as used herein is intended to mean a shape of the outer surface of peripheral wall 12 which is without any significant convex projections or concave indentations which would give peripheral wall 12 an irregular contour or for that matter any other formations projecting outwardly and/or inwardly which would detract from a smooth contour on the outer surface of peripheral wall 12. Obviously, inwardly projecting formations in peripheral wall 12 are within the scope of the present invention since such formations do not detract from the smooth outer contour of peripheral wall 12.

Figure 2:
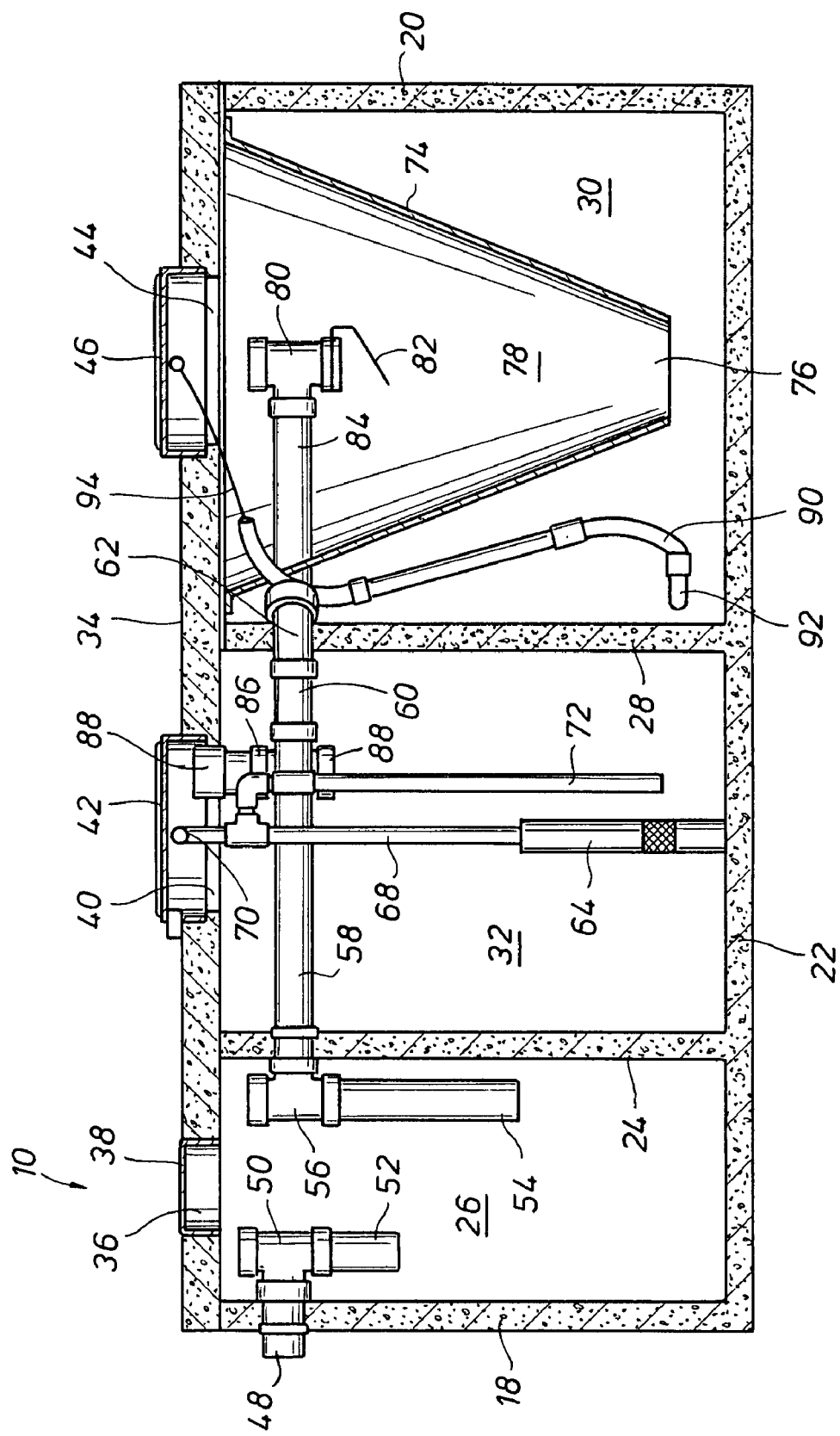
FIG. 2 is an elevational view, partly in section taken along the lines 2-2 of FIG. 1.

As best seen in FIG. 2, tank 10 has a bottom, generally planar wall 22 which is adjoined to peripheral wall 12 around its periphery. Disposed in tank 10 is an interior wall 24, wall 24, in the embodiment shown, being substantially straight and being attached to the bottom wall 22 and the peripheral wall 12. As best seen in FIG. 1, wall 24 is spaced from end wall 18 so as to form a compartment 26. Compartment 26 forms a pretreatment chamber as will be described more fully hereafter. Also disposed in the interior of tank 10 is a second interior wall 28, second interior wall 28 being spaced from interior wall 24 and end wall 20. Interior wall 28 is radiused and generally has substantially the same radius as end wall 20 thereby forming a generally cylindrical compartment 30. As described more fully hereafter, compartment 30 forms an aerobic treatment chamber 30.

Formed between compartments 26 and 30 is a third compartment 32, compartment 32 forming a holding or pump tank as described more fully hereafter.

A cover 34 generally having the shape of peripheral wall 12 when viewed in plan view overlays compartments 26, 32 and 30 and, as shown, is of one piece construction. However, it will be recognized that cover 34 could be made in sections generally corresponding in shape to compartments 26, 32 and 30 when viewed in top plan view. Cover 34 has a first manway 36 which is selectively closed by a cap 38 received in the manway 36. Cover 34 also has a manway 40 in open communication with compartment 32. A hatch 42 is received in manway 40 to generally close compartment 32. Cover 34 also has a third manway 44 in open communication with compartment 30, manway 44 being selectively covered by a hatch 46.

A pipe 48 in conjunction with a T-joint 50 and a downcomer 52 form an inlet into compartment 26. It will be appreciated that pipe 48 will be connected to a source of wastewater, i.e., from a residence or the like. Compartment 26 also has an outlet formed by stand pipe 54, a T-joint 56 and a generally horizontally extending pipe section 58. As best seen in FIG. 1, pipe section 58 is connected via an elbow 60 and a pipe section 62 to form an inlet into compartment 30.

Disposed in compartment 32 is a submersible pump 64, pump 64 being connected to a conduit 68 which in turn is connected to an outlet 70 through which water in compartment 32 can be discharged for use in irrigation, lawn watering, simple disposal, etc. Although not shown, it will be appreciated that the control pump float switch and float alarms would be used in conjunction with pump 64 in the well known manner. As can be seen, pump 64 can also be connected to an aspiration line 72 disposed in compartment 32.

Disposed in compartment 30 is an inverted, frustoconical partition 74 having a mouth or opening 76 at its lower end, partition 74 serving to divide compartment 30 into a clarifier chamber 78 and an aerobic chamber formed by the annulus surrounding partition 74. Disposed in clarifier chamber 78, is a T-joint 80 with a flapper valve 82, T-joint 80 being connected to a horizontally extending section of pipe 84, pipe 84 terminating at a T-joint 86 having an open-end 88 which opens into compartment 32. A chlorinator 88 is connected to the top of T-joint 86 and contains chlorine tablets such that effluent from chamber 78 passing into compartment 32 is chlorinated before being dispensed into compartment 32. Disposed in compartment 30 is a rigid conduit 90, conduit 90 having affixed at its lower end to a diffuser 92, diffuser 92 in turn being connected to a flexible line 94 through which is supplied air or some oxygen-containing gas from a source (not shown) but generally a compressor or the like.

In operation, raw effluent flows through pipe 48, T-joint 50 and downcomer 52 into compartment 26. Most of the solids will settle to the bottom of compartment 26 leaving a largely liquid effluent which flows through standpipe 54, pipe 58, elbow 60 and pipe 62 into compartment 30. In compartment 30, a source of oxygen from diffuser 92 aerates the liquid therein, the aerated liquid passing through mouth 76 into clarifier chamber 78 from whence any remaining solids settle and fall back through mouth 76 for further aerobic digestion. The clarified water in chamber 78 flows through T-joint 80, pipe 84 and once chlorinated via chlorinator 86 empties into compartment 32, commonly referred to as a pump tank. The clarified, chlorinated water in compartment 32 is then periodically pumped via pump 64 and conduit 70 for disposal, e.g., watering of lawns, irrigation or other purposes not generally involved in human consumption. While a submersible pump 64 is shown, it will be understood that an external pump having a dip pipe extending into compartment 32 could be employed to pump water out of compartment 32 for purposes described above.

Although not shown, it will be appreciated that various electrical connections would be made to any float switches, alarms, etc.

The tank 10 used in the embodiment shown in FIGS. 1 and 2, provides many advantages over prior art systems. For one, since it is a single unit having a planar bottom wall, a single excavation having only one bottom elevation is required. Additionally, the design of the tank serves to maintain it in a stable disposition, i.e., without a tendency for either end to float even in areas where there is a high water table. For example, should the water in compartment 32 be substantially depleted, water in compartments 26 and 30 will serve to weight balance the system, keeping it in a stable position preventing either end from floating.

As shown, tank 10 is made of concrete. As is well known to those skilled in the art, in concrete tanks used in aerobic wastewater treatment plants of the type under consideration, it is generally necessary for substantial reinforcing wire or steel to be employed to retain the structural integrity of the tank both under transport and installation conditions. Additionally, such wire or steel reinforcement serves the purpose of withstanding internal pressure exerted by water in the tank. By constructing the tank such that it is an oval-like shape with radiused side walls as well as radiused end walls which are adjoined to one another to form a smooth contour on the outer surface of the peripheral wall, internal pressures from water can be more evenly distributed. For example, in cases where the side walls 14 and 16 were substantially parallel and had substantially parallel inner surfaces force vectors from internal pressure would all be parallel to one another and perpendicular to the side walls 14 and 16. In the oval-like design shown in FIG. 1, such force vectors are distributed in a generally non-parallel array over the surface of the side walls 14 and 16. Accordingly, it is possible to use less or lighter weight steel or wire reinforcing and in certain cases to eliminate such reinforcing in favor of fibrous fillers and reinforcing agents which not only reduce the weight of the tank but decrease manufacturing costs.

Figure 3:
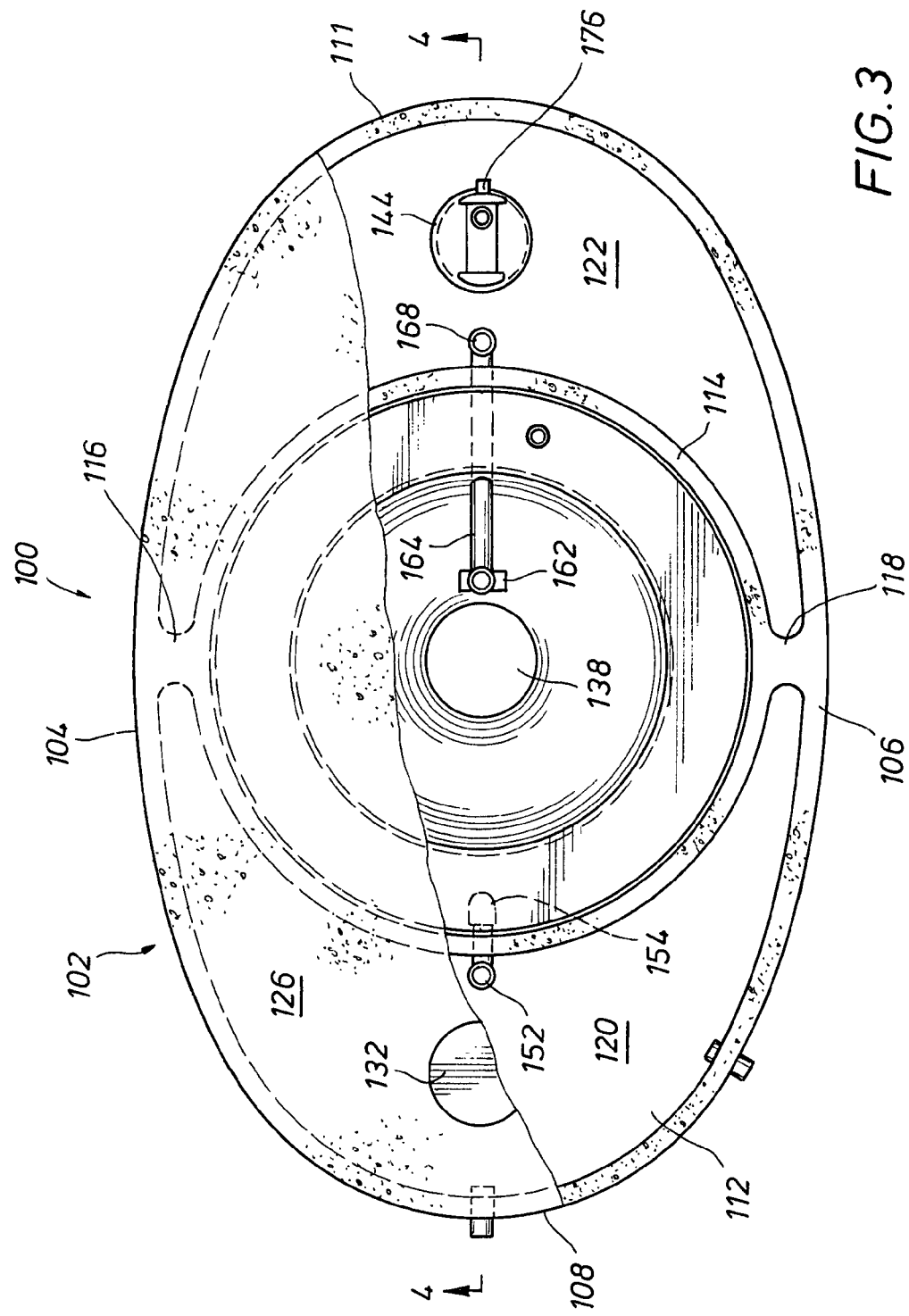
FIG. 3 is a top plan view of another embodiment of the wastewater treatment plant of the present invention.
Figure 4:
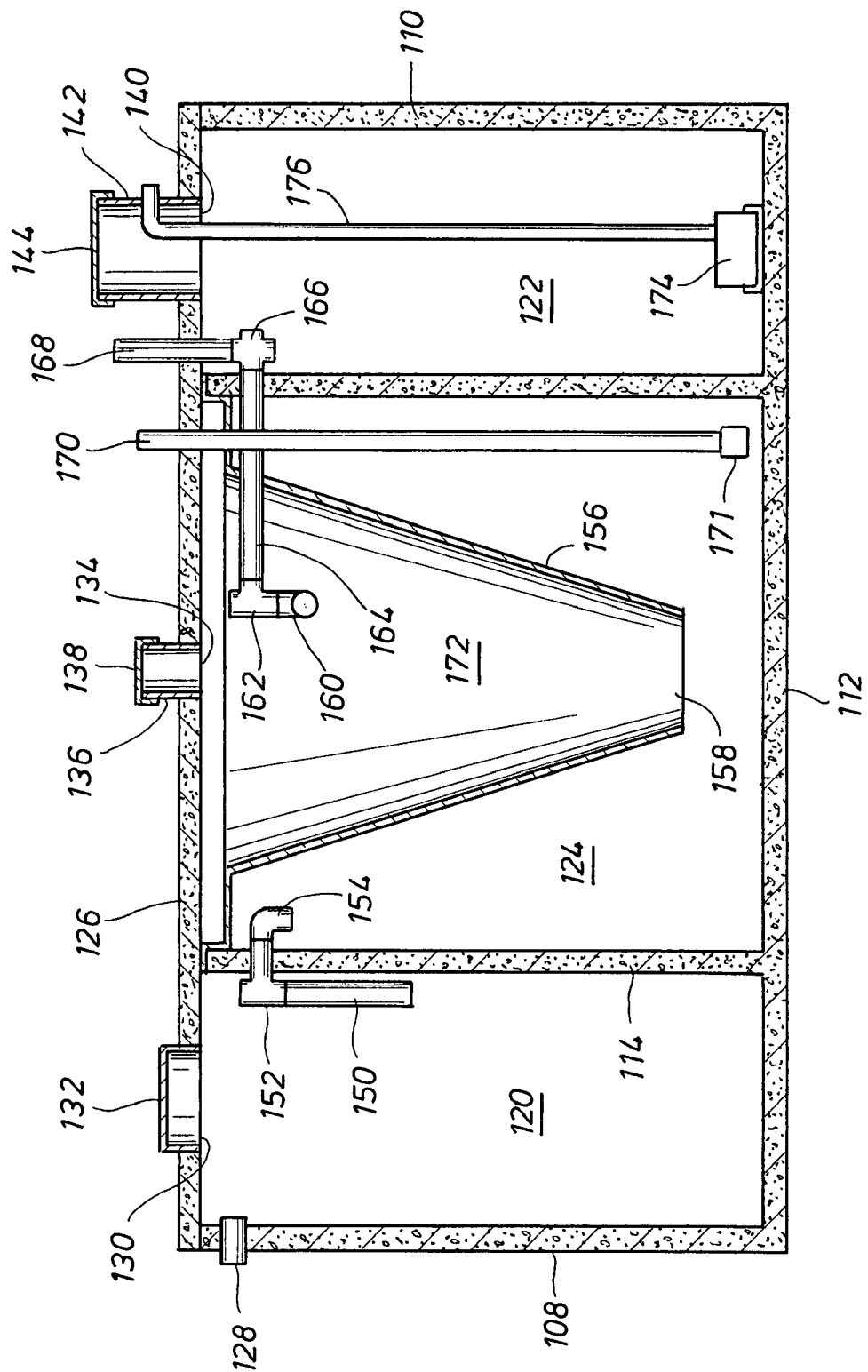
FIG. 4 is a side, elevational view taken along the lines 4-4 of FIG. 3.

Referring now to FIGS. 3 and 4, there is shown another embodiment of the present invention. Referring first to FIG. 3, there is shown a tank 100 having a peripheral wall 102 which as seen in top plan view generally forms an oval-like shape. Peripheral wall 102 like peripheral wall 12 has a first convex side wall 104, a second convex side wall 106, a first radiused end wall 108 and a second radiused end wall 110. As in the case of the embodiment shown in FIG. 1, the outer surface of peripheral wall 102 has a generally smooth contour as that term is defined and used above. Tank 100 also comprises a generally planar bottom wall 112, peripheral wall 102 being attached to bottom wall 112. Disposed interiorally of tank 100, is a generally cylindrical wall 114, cylindrical side wall 114 being attached to bottom wall 112, a first gusset 116 interconnecting side wall 104 and cylindrical wall 114, a second gusset 118 interconnecting cylindrical side wall 114 and side wall 106. Gussets 116 and 118, although not shown, can extend for the full length of cylindrical wall 114. As drawing, cylindrical wall 114 is generally equidistant from end walls 108 and 110 as well as being generally equidistant from side walls 104 and 106. Thus, gussets 116 and 118 generally bisect tank 100 thereby essentially forming a first compartment 120 defined by end wall 108, portions of side walls 104 and 106 and a portion of interior cylindrical wall 114. Likewise, a second compartment 122 is formed by end wall 110, portions of side walls 104 and 106, and a portion of cylindrical wall 114. Because gussets 116 and 118 generally bisect tank 100, compartments 120 and 122 would be of generally equal volume. It will be appreciated that the gussets 116 and 118 could be connected between the peripheral wall 102 and cylindrical wall 114 such that compartments 120 and 122 had different volumes. Indeed, in the usual case, compartment 120 will be substantially smaller than compartment 122. As best seen in FIG. 4, cylindrical wall 114 forms a compartment 124 disposed between compartments 120 and 122. Overlying peripheral wall 102 is a cover 126 which, while shown as being one piece can be in multiple pieces as described above with respect to the embodiment shown in FIGS. 1 and 2. A pipe 128 forms an inlet to compartment 120, wastewater from a source such as a residence entering compartment 120 through pipe 128. Cover 126 has a manhole 130 covered by a hatch 132 providing access to the interior of compartment 120. Cover 132 also has a manway 134 in which is fitted a pipe 136, a cap 138 being fitted over pipe 136. Cover 126 also includes a manway 140 in which is fitted a pipe 142, a cap 144 fitting over pipe 142.

A riser 150 coupled to a T-joint 152 extending through cylindrical wall 114 and coupled to an elbow 154 forms an outlet from compartment 120 and an inlet to compartment 124. Disposed in compartment 124 is a partition 156 having an generally inverted frustoconical shape with a mouth or opening 158 facing towards bottom wall 112. First and second T-joints 160 and 162 in conjunction with horizontal pipe 164, which extends through partition 156 and cylindrical wall 114, and cross fitting 166 form an outlet from compartment 124 and an inlet into compartment 122. Connected to one branch of cross fitting 166 is a chlorinator 168 through which chlorine tablets or the like can be introduced into effluent passing from compartment 124 into compartment 122. Extending through cover 126 and into compartment 124 is a tube 170, the upper end of tube 170 being connected to a source of air or other oxygen-containing gas, the lower end of tube 170 extending into compartment 124 and generally being fitted with a diffuser 171 such that water in compartment 124 can be aerated. In this regard, partition 156 serves to divide compartment 124 into a clarifier chamber 172 located within the confines of partition 156 and an aeration chamber generally defined by the annulus surrounding partition 156. Clarified water flowing from chamber 172 into compartment 122 is pumped from compartment 122, commonly referred to as a pump tank, via a submersible pump 174 in a conduit 176, conduit 176 being connected in a suitable manner to an irrigation system or the like for disposal of the water in compartment 122. Although not shown, it will be appreciated pump 174 would be connected to a suitable float switch to turn the pump on and off when the water level in compartment 122 reaches a certain level. Alternatively, as in the case of all the embodiments disclosed, the pump could be connected to a timer which periodically turned the pumps on and off in some cyclic fashion, e.g., only at night.

The oval-like design of the pump tank shown in FIGS. 3 and 4 of this embodiment of the present invention has the same advantages as that described above with respect to the embodiments shown in FIGS. 1 and 2 in terms of more equal pressure distribution of internal pressure acting on the peripheral wall 102. Additionally, by positioning the wall forming the cylindrical compartment 124 in generally the center of tank 102, the relative volumes of compartments 126 and 122 can be easily adjusted simply by repositioning the gussets. For example, with reference to FIG. 3, if gussets 116 and 118 were moved to the right towards end wall 110, it will be apparent that the volume of compartment 122 would be reduced while the volume of compartment 126 would be increased.

The foregoing description and examples illustrate selected embodiments of the present invention. In light thereof, variations and modifications will be suggested to one skilled in the art, all of which are in the spirit and purview of this invention.

What is claimed is:

1. An aerobic wastewater treatment plant comprising:

a tank having a peripheral wall and a generally planar bottom wall, said peripheral wall comprising first and second spaced side walls and first and second spaced end walls, each of said first and second end walls being radiused and having at least portions thereof which have the same radius, said first and second side walls having a shape and being adjoined to said first and second end walls such as to form a smooth contour on the outer surface of said peripheral wall;

a first interior wall connected to said peripheral wall and said bottom wall, said first interior wall being spaced from said first end wall, a first compartment being formed by said first end wall and said first interior wall, said first compartment forming a pretreatment chamber and having an inlet and an outlet;

a second interior wall connected to said peripheral wall and said bottom wall, said second interior wall being spaced from said first interior wall and said second end wall, said second interior wall and said second end wall cooperating to form a generally cylindrical second compartment forming an aerobic treatment chamber, said second compartment having an inlet and an outlet;

a third compartment forming a holding chamber formed between said first compartment and said second compartment, said third compartment having an inlet and an outlet;

said outlet from said first compartment being in open communication with said inlet to said second compartment;

said outlet from said second compartment being in open communication with said inlet to said third compartment.

2. The aerobic wastewater treatment plant of claim 1, wherein said first and second side walls are convex.

3. The aerobic wastewater treatment plant of claim 1, wherein said outlet from said third compartment is operatively connected to a pump for pumping water from said holding chamber.

4. The wastewater treatment plant of claim 1, wherein said second compartment includes a clarifier chamber in open communication with said aerobic treatment chamber, said outlet from said second compartment being in open communication with said clarifier chamber.

5. An aerobic wastewater treatment plant of claim 1, wherein said first interior wall is substantially straight.

6. An aerobic wastewater treatment plant comprising:

a tank having a peripheral wall and a generally planar bottom wall, said peripheral wall comprising first and second spaced side walls and first and second spaced end walls, each of said first and second end walls being radiused and having at least portions thereof which have the same radius, said first and second side walls being convex and being adjoined to said first and second end walls such as to form a smooth contour on the outer surface of said peripheral wall;

a first generally cylindrical compartment formed in said tank between said first and second end walls by an interior cylindrical wall connected to said bottom planar wall, said first compartment forming an aerobic treatment chamber, said first compartment having an inlet and an outlet, said first compartment forming an aerobic treatment chamber;

a second compartment formed between said first end wall and said cylindrical compartment, said second compartment having an inlet and an outlet, said second compartment facing a pretreatment chamber;

a third compartment formed between said second end wall and said cylindrical compartment, said second compartment having an inlet and an outlet, said third compartment forming a pump tank;

said outlet from said second compartment being in open communication with said inlet to said first compartment;

said outlet from said first compartment being in open communication with said inlet to said third compartment.

7. An aerobic wastewater treatment plant of claim 6, wherein said interior cylindrical wall is connected to said first side wall by a first gusset and to said second side wall by a second gusset.

8. An aerobic wastewater treatment plant of claim 6, wherein said first compartment includes a clarifier chamber in open communication with said aerobic treatment chamber, said outlet from said cylindrical compartment being in open communication with said clarifier chamber.

9. An aerobic wastewater treatment plant of claim 6, wherein said outlet from said third compartment is operatively connected to a pump for pumping water from said pump tank.

* * * * *